UNITED STATES PATENT OFFICE.

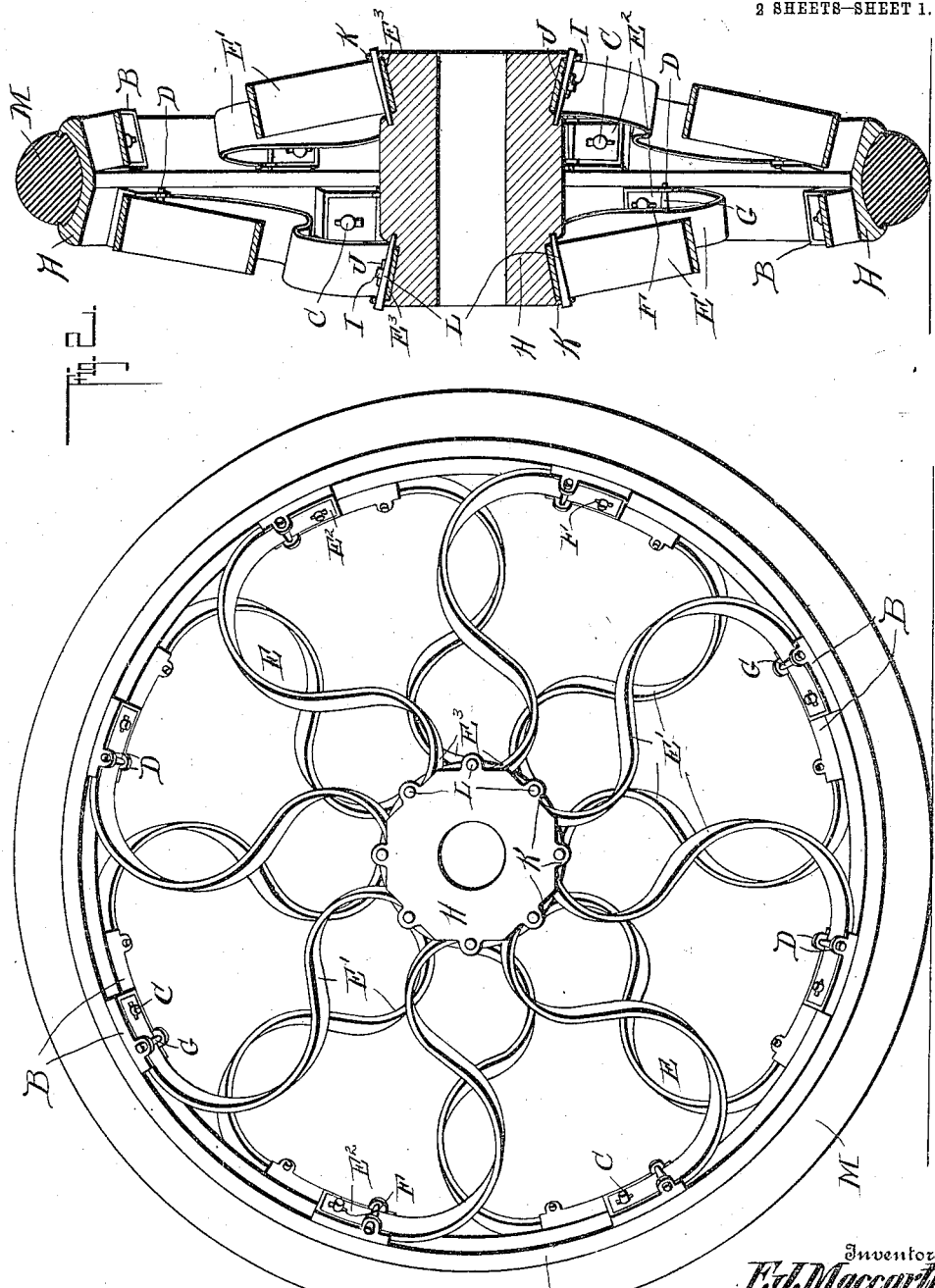

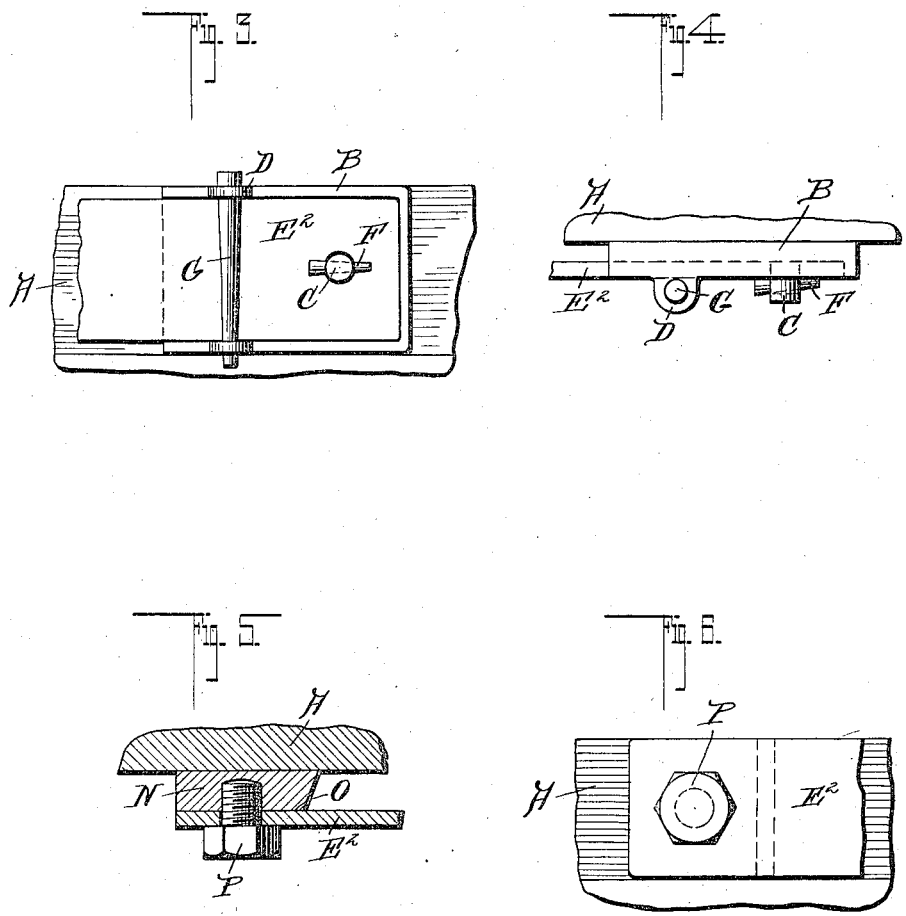

FRANK J. MACCARTHY, OF SEATTLE, WASHINGTON, ASSIGNOR OF ONE-THIRD TO GEORGE L. MEAGHER AND ONE-THIRD TO E. S. BLACKWELL, OF SEATTLE, WASHINGTON.

SPRING-WHEEL FOR AUTOMOBILES.

993,388. Specification of Letters Patent. Patented May 30, 1911.

Application filed April 30, 1909. Serial No. 493,150.

*To all whom it may concern:*

Be it known that I, FRANK J. MACCARTHY, a citizen of the United States, residing at Seattle, in the county of King and State of Washington, have invented a new and useful Improvement in Spring-Wheels for Automobiles, of which the following is a specification.

This invention relates to certain new and useful improvements in spring wheels especially adapted to be used for automobiles and the like, the object being to provide a spring wheel which is so constructed that solid tires can be used on the same.

A still further object of my invention is to provide a spring wheel, the spokes of which are formed of a pair of compound bent springs which are so connected to the hub and rim that they form a double loop whereby they will give in all directions.

A still further object of the invention is to provide a spring wheel which is exceedingly simple in construction and one which is composed of parts which are so arranged and connected together that it is almost impossible for the same to get out of place in use.

A still further object of the invention is to provide novel means for connecting the ends of the springs to the rim and hub so that they can be easily and quickly attached or detached.

A still further object of my invention is to provide a hub which is cut octagonally to form seats for the spring.

With these objects in view my invention consists of the novel features of construction, combination and arrangement of parts hereinafter fully described, pointed out in the claim and shown in the accompanying drawings, in which, Figure 1 is a side elevation of my improved spring wheel. Fig. 2 is a vertical section through the same. Fig. 3 is a detail plan view of a portion of the rim, block and spring showing the manner of securing the spring thereto. Fig. 4 is a side elevation of the same. Fig. 5 is a detail view of a modified form for fastening the spring thereon. Fig. 6 is a plan view of the same.

In carrying out my improved invention I employ a grooved metal rim A formed of steel or any other suitable metal which will be rigid so that the same will not give. Secured to the inner face of the rim are grooved blocks B which are provided with pins C and with apertured lugs D for the purpose of securing spring spoke members E therein as will be hereinafter fully described.

The spring spokes E are formed of a pair of compound bent springs E' having apertured ends $E^2$, $E^3$ the ends $E^2$ fitting in the grooves of the blocks B and the pins C of the blocks extend through the openings of the springs and are provided with transverse bores through which cotter pins F are adapted to pass for securing the springs therein. To insure the spring being held rigidly in position within the blocks tapering pins G are forced through the apertured lugs D over the springs so that all danger of the springs jumping out of the grooves in the blocks is prevented.

The wheel is provided with a hub H cut octagonally as clearly shown in Fig. 1 so as to form seats for the respective ends of the spring members of the spokes which are slightly beveled as clearly shown so that the spokes will rest flatly upon the seats and these seats are inclined in opposite directions and are provided with pins I over which the apertured ends $E^3$ of the compound bent spring members are adapted to fit and are secured by cotter pins J which pass through transverse bores formed in the pins I and securely lock the springs in position. Apertured lugs K are formed on the outer sides of the seats of the hub through which tapering pins L are adapted to pass for securing the spokes thereto and it will be seen that in arranging the spring members of the spokes in position they arrange alternately so that the spring of one spoke will be out of the way of the spring of the other spoke.

It will be seen that by this construction each of the spokes will yield independently of the adjacent spoke so that if a boulder is struck by the machine passing over a road the wheel will give to such an extent that all danger of the wheel getting broken is prevented. A solid tire M is used in connection with the wheel but it is of course understood that any suitable form of tire can be used as desired but I have found by experimenting that a wheel of this character having a solid tire arranged thereon will ride as smoothly as the ordinary wheel now in use having a pneumatic tire.

In Figs. 5 and 6 I show the blocks N and seats O of the rim and hub provided with threaded bores in which are adapted to be screwed set-screws P for locking the ends of the spring members in position.

What I claim is:—

A spring wheel comprising a rim having a plurality of grooved blocks secured to its inner face arranged in pairs, pins extending inwardly from said grooved blocks having transverse bores, apertured lugs formed on the sides of said blocks, a hub cut octagonally to form seats, spokes formed of compound bent spring members having apertured ends arranged in the blocks of the rim, and having means for securing their ends to the hub, cotter pins extending through the pins of the blocks, and tapering pins extending through the apertured lugs of the blocks for securing said spring members in position.

FRANK J. MACCARTHY.

Witnesses:
J. W. O'BRIEN,
H. C. McGABA.

Copies of this patent may be obtained for five cents each, by addressing the "Commissioner of Patents, Washington, D. C."